United States Patent
Saini et al.

(10) Patent No.: US 8,993,490 B2
(45) Date of Patent: Mar. 31, 2015

(54) METHOD FOR THE REMOVAL OR SUPPRESSION OF INTERFERING METAL IONS USING ENVIRONMENTALLY FRIENDLY COMPETITIVE BINDERS

(75) Inventors: Rajesh K. Saini, Cypress, TX (US); Jeremy Holtsclaw, Lawton, OK (US); David M. Loveless, Duncan, OK (US); Lucas K. Fontenelle, Norman, OK (US); Prajakta R. Patil, Pune (IN); Ramesh Muthusamy, Dharmapuri District (IN)

(73) Assignee: Halliburton Energy Services, Inc., Houston, TX (US)

( * ) Notice: Subject to any disclaimer, the term of this patent is extended or adjusted under 35 U.S.C. 154(b) by 655 days.

(21) Appl. No.: 13/331,746

(22) Filed: Dec. 20, 2011

(65) Prior Publication Data

US 2013/0157905 A1  Jun. 20, 2013

(51) Int. Cl.
| | |
|---|---|
| *C09K 8/52* | (2006.01) |
| *C09K 8/12* | (2006.01) |
| *C09K 8/68* | (2006.01) |
| *C09K 8/74* | (2006.01) |
| *E21B 21/06* | (2006.01) |
| *C02F 1/28* | (2006.01) |
| *C02F 1/68* | (2006.01) |
| *C02F 5/08* | (2006.01) |
| *C02F 101/10* | (2006.01) |
| *C02F 101/20* | (2006.01) |
| *C02F 103/36* | (2006.01) |

(52) U.S. Cl.
CPC ... *C09K 8/12* (2013.01); *C09K 8/52* (2013.01); *C09K 2208/32* (2013.01); *C09K 8/685* (2013.01); *C09K 8/74* (2013.01); *E21B 21/068* (2013.01); *C09K 2208/26* (2013.01); *C02F 1/288* (2013.01); *C02F 1/683* (2013.01); *C02F 5/08* (2013.01); *C02F 2101/108* (2013.01); *C02F 2101/20* (2013.01); *C02F 2103/365* (2013.01)
USPC ........................................ 507/219; 166/305.1

(58) Field of Classification Search
None
See application file for complete search history.

(56) References Cited

U.S. PATENT DOCUMENTS

| | | | |
|---|---|---|---|
| 5,082,056 A | 1/1992 | Tackett, Jr. | |
| 7,160,842 B2 | 1/2007 | Crews | |
| 2002/0086909 A1* | 7/2002 | Brown | 516/98 |
| 2002/0125012 A1 | 9/2002 | Dawson et al. | |

(Continued)

FOREIGN PATENT DOCUMENTS

| | | |
|---|---|---|
| EP | 0 379 236 A1 | 7/1990 |
| WO | WO 9936668 A1 * | 7/1999 |

(Continued)

OTHER PUBLICATIONS

International Search Report and Written Opinion for PCT/US2012/064148 dated Feb. 6, 2013.

*Primary Examiner* — Alicia Bland
(74) *Attorney, Agent, or Firm* — McDermott Will & Emery LLP; Craig W. Roddy

(57) ABSTRACT

The present invention relates to environmentally friendly compositions and methods for removing or suppressing metal ions in waters, flowback waters, and produced waters to make such waters suitable for subsequent use in oil-field applications and for delinking metal cross-linked gelling agents. One embodiment of the present invention provides a method of providing a competitive binder and allowing the competitive binder to interact with interfering metal ions in a flowback fluid to suppress or remove interfering metal ions.

15 Claims, 3 Drawing Sheets

(56) References Cited

U.S. PATENT DOCUMENTS

| | | | |
|---|---|---|---|
| 2002/0160920 A1* | 10/2002 | Dawson et al. | 507/200 |
| 2007/0138101 A1 | 6/2007 | Javora et al. | |
| 2010/0307753 A1* | 12/2010 | Rey et al. | 166/305.1 |
| 2010/0323929 A1 | 12/2010 | Reddy et al. | |
| 2011/0237470 A1 | 9/2011 | Li et al. | |

FOREIGN PATENT DOCUMENTS

| | | |
|---|---|---|
| WO | 2009/091652 A2 | 7/2009 |
| WO | 2013095801 A1 | 6/2013 |

* cited by examiner

METHOD FOR THE REMOVAL OR SUPPRESSION OF INTERFERING METAL IONS USING ENVIRONMENTALLY FRIENDLY COMPETITIVE BINDERS

BACKGROUND

The present invention relates to environmentally friendly compositions and methods for removing or suppressing metal ions. More specifically, the present invention relates to competitive binders and methods of use thereof to remove or suppress metal ions from waters, flowback waters, and produced waters to make such waters suitable for subsequent use in oil-field applications. The present invention is also suitable for delinking metal cross-linked gelling agents.

Removal or suppression of interfering metal ions from water or produced water is often desirable in oil-field applications (e.g., hydraulic fracturing) because the interfering metal ions can interfere with fluid formation. Examples of interfering metal ions typically found in subterranean applications include, but are not limited to, calcium, magnesium, manganese, strontium, boron, cobalt, copper, zirconium, titanium, aluminum, iron, chromium, hafnium, and the like. These interfering metal ions can come from an external source such as ground water contamination or, in some cases, from the treatment fluids. The concentrations of interfering metal ions must generally be maintained in a suitable range, in order to reuse or dispose the spent treatment fluids.

In the absence of a method of controlling or reducing interfering metal ion concentrations, several undesirable outcomes may result. Some of these include, but are not limited to: gels not cross-linking (or not cross-linking to a suitable degree); interfering metal ions prematurely breaking the gels; interfering metal ions activating oxidizers which in turn can quickly break the gels; gels undergoing syneresis due to the presence of divalent or trivalent metal ions due to over cross-linking; and precipitates forming at elevated pH, which can cause undesirable complications such as plugging of the subterranean formation.

In fracturing applications, interfering metal ions are often introduced as cross-linking agents to coordinate the functional groups of polymeric chains found in fracturing fluids. While this is an important process to increase the viscosity of the fracturing fluids, it is often desirable to suppress or remove the interfering metal ions at a later time in order to reduce the viscosity of the fracturing fluids. For example, a lower viscosity may be desirable to allow flowback of the spent fracturing fluid, for example, as part of the fracturing fluid disposal process. This reduction in viscosity is often achieved by introducing a breaker to the fracturing fluid that breaks the cross-linking bonds and the polymer backbone of the polymeric gels.

It is also important, in fracturing applications, to control the kinetics of breaking. A breaker that acts too rapidly may hinder the proppant carrying capacity of a particular fracturing fluid. A low viscosity fluid such as water is usually inadequate for fracturing applications because its low viscosity limits its ability to transport proppant.

Currently, there are breakers that are designed to provide delayed breaking action of an oilfield fluid. However, at relatively high temperatures, these breakers tend to perform poorly (e.g., break rapidly) or degrade (e.g., enzyme breakers are susceptible to temperature dependent denaturation). Moreover, these breakers are not environmentally friendly, which may cause regulatory issues. For example, the countries of the North Sea region strongly favor the use of chemicals that have high biodegradability in seawater and low toxicity. Thus, chemicals that are used and discharged in offshore drilling operations are typically evaluated for environmental friendliness. Breakers that receive the red rating under the guidelines of The Convention for the Protection of the Marine Environment of the North East Atlantic (also known as the "OSPAR Convention") have low degradability rates and/or may be toxic. These breakers typically require permission to discharge and/or are being phased out.

SUMMARY OF THE INVENTION

The present invention relates to environmentally friendly compositions and methods for removing or suppressing metal ions. More specifically, the present invention relates to competitive binders and methods of use thereof to remove or suppress metal ions from waters, flowback waters, and produced waters to make such waters suitable for subsequent use in oil-field applications. The present invention is also suitable for delinking metal cross-linked gelling agents.

In some embodiments, the present invention provides methods comprising: providing a competitive binder; and allowing the competitive binder to interact with interfering metal ions in a flowback fluid to suppress or remove interfering metal ions.

In some embodiments, the present invention provides methods comprising: providing a competitive binder; providing a viscosified treatment fluid having a cross-linked gelling agent and having a first viscosity; allowing the competitive binder to interact with the cross-linked gelling agent of the viscosified treatment fluid so as to delink the cross-linked gelling agent thus reducing the first viscosity of the viscosified treatment fluid to a second viscosity.

In some embodiments, the present invention provides methods comprising: introducing a first competitive binder to a flowback fluid wherein the first competitive binder coordinates with an interfering metal ion in the flowback fluid thereby forming a competitive binder-metal complex; filtering out the competitive binder-metal complex thereby forming a reusable fluid; using the reusable produced water as a base fluid to form a treatment fluid having a first viscosity; introducing the treatment fluid to a subterranean formation and allowing a cross-linked gelling agent to form; and introducing a second competitive binder to the treatment fluid thereby delinking the cross-linked gelling agent of the viscosified treatment fluid so as to reduce the first viscosity of the viscosified treatment fluid to a second viscosity.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

Figure 1:
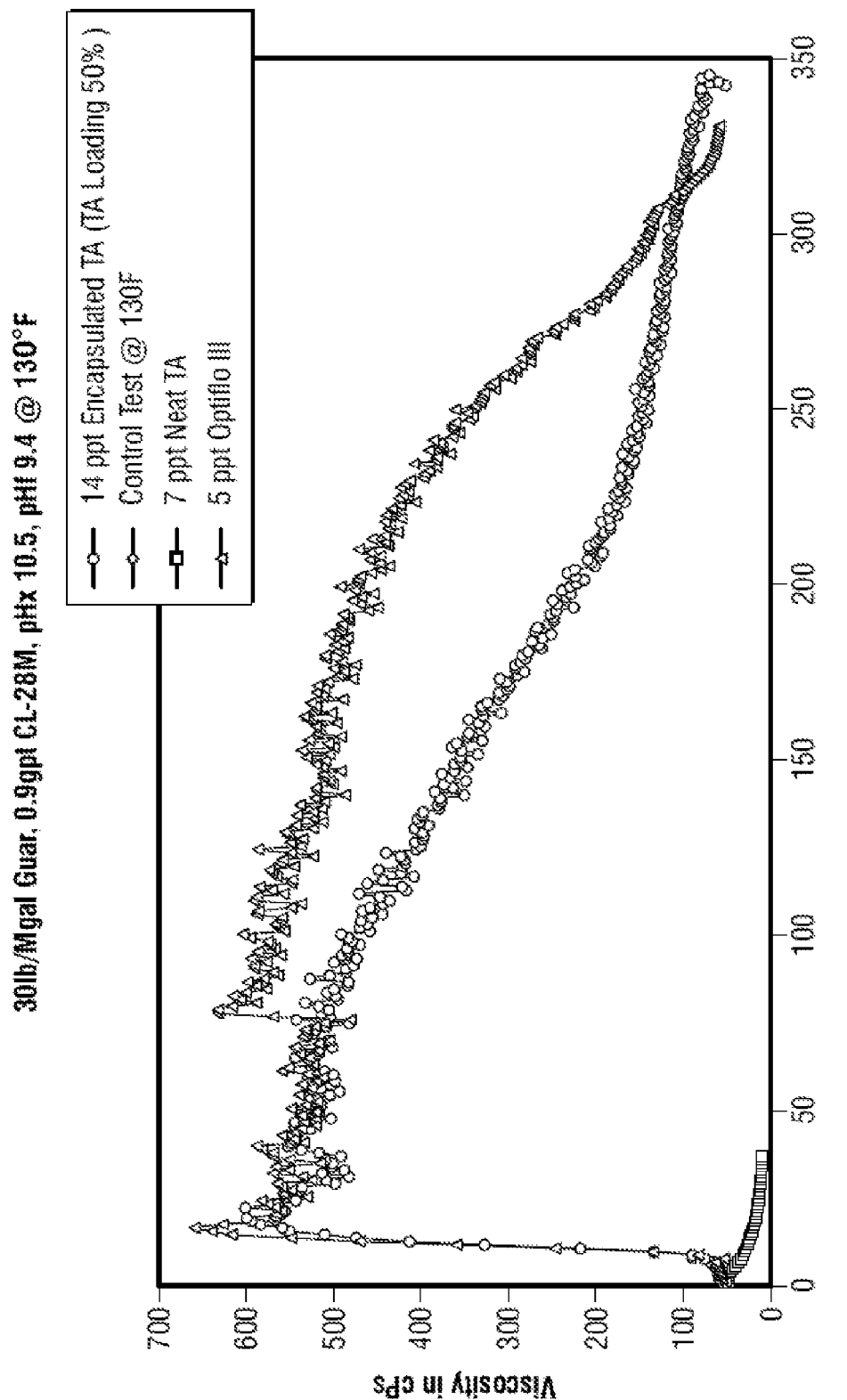
FIG. 1 shows a rheological plot as described in Example 1.

The present invention relates to environmentally friendly compositions and methods for removing or suppressing metal ions. More specifically, the present invention relates to competitive binders and methods of use thereof to remove or suppress metal ions from waters, flowback waters, and produced waters to make such waters suitable for subsequent use in oil-field applications. The present invention is also suitable for delinking metal cross-linked gelling agents.

The present invention provides compositions and methods for removing or suppressing interfering metal ions. The present invention is particularly useful for removing or suppressing interfering metal ions from flowback fluids and for delinking metal cross-linked gelling agents.

As used herein, the term "interfering metal ion" generally refers to metal ions desirable for suppression or removal from a particular fluid because of an effect caused by the ion that may be considered to be interfering with a desirable outcome or state. In some instances, this may be context dependent. Examples of interfering metal ions include, but are not limited to, calcium, magnesium, strontium, boron, cobalt, copper, zirconium, titanium, aluminum, iron, chromium, hafnium, and the like.

The term "flowback fluids" is used herein to collectively and generically refer to produced waters, flowback waters, flowback fluids, returning treatment fluids, and the like. As used herein, "produced water" generally refers to water produced from a wellbore that is not primarily a treatment fluid and may contain formation waters. In many cases, the composition of a flowback fluid is inexact or unknown.

It is believed that the removal or suppression of the interfering metal ions may be achieved by the use of competitive binders as described herein, which can interact with the interfering metal ions to remove or suppress the interfering metal ions. The term "competitive binder" as used herein refers to a binding molecule that interacts (e.g., coordinates, chelates, bonds, etc.) with the interfering metal ions as described herein. The competitive binders are generally structured to provide efficient and effective suppression and possibly removal of interfering metal ions. The binding constants of the competitive binders to metal ions are generally high.

A key benefit of removing or suppressing interfering metal ions from flowback fluids is that the flowback fluids can be reused, for example, as a base fluid of a subsequent treatment fluid. In some cases, removal of interfering metal ions makes the flowback fluids more suitable for eventual disposal. Thus, the present invention should provide both cost and environmental benefits.

The present invention can also controllably delay the kinetics of delinking metal cross-linked gelling agents. This may be accomplished by the use of encapsulant that encapsulates the competitive binder. In general, the encapsulant provides a barrier that delays the release of competitive binder, which can remove or suppress interfering metal ions. This delay effectively leads to a delayed reduction in viscosity, which is advantageous in fracturing applications. In particular, it is believed that the methods and compositions of the present invention may be used even at relatively high temperature ranges (about 66° C. or 150° F. to about 82° C. or 180° F.). At these temperatures, the competitive binders of the present invention should be stable (i.e., do not degrade) while delaying the delinking action of cross-linked polymers.

Yet another advantage is that the present invention may provide environmentally friendly competitive binders that are readily biodegradable after use. As used herein, the term "biodegradable," refers to the conversion of materials into smaller components, intermediates, or end products by the result of solubilization, hydrolytic degradation, biologically formed entities (e.g., bacteria or enzymes), chemical reactions, thermal reactions, reactions induced by radiation, or any other suitable mechanism. In some cases, the competitive binders are self-degradable or otherwise degradable by environmentally friendly means. Thus, the present invention may be particularly useful in environmentally sensitive areas or areas with strict environmental regulations such as the North Sea. In some cases, the competitive binders may be regenerated and used again as well.

Additionally, the methods of the present invention may be relatively easy to implement on a large scale (e.g., sequestering beads can be dumped in produced water tank and then filtered to obtain treated water that is suitable for oilfield use or disposable). This is particularly useful when dealing with large volumes of fluid typically used in subterranean operations.

The present invention provides methods generally comprising: providing a competitive binder; and allowing the competitive binder to interact with interfering metal ions in a flowback fluid to suppress or remove the interfering metal ions. Optionally, the methods may further comprise using the flowback fluid to form a treatment fluid or disposing of the flowback fluid. Optionally, the methods may further comprise introducing the treatment fluid into a subterranean formation.

In some embodiments, the treatment fluid may be a fracturing fluid, a drilling fluid, a cementing fluid, or a gravel packing fluid.

In some embodiments, the interfering metal ions comprise at least one selected from the group consisting of calcium, magnesium, strontium, boron, borate, strontium, barium, iron, titanium, copper, manganese, chromium, aluminum, hafnium, zirconium, and any combinations of these. These interfering metal ions may come from a variety of sources including produced waters, flowback waters, flowback fluids, treatment fluids, and the like.

In some embodiments, the competitive binder is soluble in the flowback fluid. In other embodiments, the competitive binder is insoluble in flowback fluid. In some embodiments, a soluble competitive binder is made insoluble after binding to a solid support that is insoluble.

In some embodiments, the competitive binder is polyol, polycarboxylate, hydroxycarboxylate, hydroxylamide, amines, polyamine, polyaminecarboxylate, polycarboxylic acid, polyamides, polyphosphates, polyphosphonates, phosphates, phosphonates, polyphenol, polysaccharides, substituted polysaccharides containing chelant groups, chitosan, chitin, and the like. In some embodiments, the competitive binder is a small molecule. Small molecules suitable for use as a competitive binder include, but are not limited to, tannic acid, catechol, dopamine, sorbitol, salicylic acid, 4-amino-2-hydroxybenzoic acid, fluoride, ethylenediaminetetraacetic acid (EDTA), nitrilotriacetic acid (NTA), and any combination of these. In some embodiments, the competitive binder is a polymer synthesized, for example, by free radical polymerization reaction. Polymers suitable for use as a competitive binder generally comprise a functional group that is capable of coordinating with metal ions.

In some embodiments, the competitive binder is present in less than about 5% by weight of the flowback fluid. In some embodiments, the competitive binder is present in about 0.005% to about 1% by weight of the flowback fluid. The exact amount of competitive binder used may depend on a number of factors, e.g., the amount of interfering metal ions to be removed or suppressed. It is generally desirable to maintain about 2 to 3 times stoichiometric amounts of the competitive binder to the amount of interfering metal ions for effective removal or suppression of interfering metal ions.

In some embodiments, the competitive binder may be bound or grafted on a solid surface. Suitable examples of solid surfaces include, but are not limited to, membranes, beads, pulp, and the like. Optionally, the competitive binder bound to a solid surface may be removed from the flowback fluid by filtration or packed in a column through which the flowback fluid is passed to remove the interfering metal ions.

In some embodiments, the competitive binder bound to a solid surface may be a bead (e.g., polystyrene resin bead) comprising the competitive binder on the surface. In one preferred embodiment, styrene beads can be formed with salicylic acid to form polystyrene-azo-salicylic acid resin. This salicylic acid resin is believed to be selective for copper and aluminum and may be made into any form that is compatible for use with produced water.

In some embodiments, the competitive binder bound to a solid surface may be packed into a column. Produced water can be passed through this column in order to remove or suppress interfering metal ions. Without being limited by theory, it is believed that the repetitive passing of water will increase the effectiveness in removing or suppressing the interfering metal ions.

Insoluble solid surfaces are particularly useful since the concentration of interfering metal ions need not be known beforehand when determining the amount of competitive binder to use. Furthermore, it is convenient to filter out an interfering metal ion that is bound to a competitive binder which in turn is attached to an insoluble solid surface. In some embodiments, the insoluble solid surface may then be separated out. Suitable separation methods include, but are not limited to, filtering by gravity, packing of solid support in a column, and the like. This effectively removes the interfering metal ion, thus resulting in a reusable flowback fluid. In some embodiments, this reusable flowback fluid may be used to formulate a new treatment fluid.

Similarly the competitive binder can be grafted on inorganic materials such as silica, zirconia, alumina, clays, etc. to treat flowback fluids. In some embodiments, a competitive binding functional group may be attached to a mineral surface such as silica surface and then added to the fluid to be treated. In some embodiments, the inorganic materials are packed in a column. In some embodiments, the inorganic material may be filtered out after binding or complexing with the interfering metal ions.

In some embodiments, the functional groups that are capable of coordinating with metal ions can be grafted on suitable polymers or incorporated in at least one monomer that is polymerized later. In some embodiments, the polymers containing these groups can be cross-linked to form solid beads, meshes, or membranes to treat the water in a two phase system. Suitable functional groups comprising moieties include, but are not limited to, cis-diols, 1,2-hydroxycarboxylates, polyalcohols, polyphenols (e.g., lignosulfonates), amines, hydroxycarboxylate, hydroxylamide, carboxylamines, polycarboxylic acids, hydroxyketones, polycarboxylamine, polyamines, polyamides, polyphosphates, polyphosphonates, phosphates, phosphonates, and combinations of these.

In some embodiments, the flowback fluid may comprise a viscosified treatment fluid such as a fracturing fluid. In some embodiments, the fracturing fluid may further comprise at least one selected from the group consisting of surfactants, scale inhibitors, acids, proppants, and any combinations of these.

In some cases, the competitive binders may be regenerated after use with dilute acid or by displacing the interfering metal ion from the surface with non-interfering metal ions such as sodium or potassium with salt treatments. This displacement is similar to what occurs in an ion exchange resin where hard ions are substituted for soft ions. These regenerated competitive binders may be used again.

In some cases, the competitive binders may be encapsulated to provide a delay in the action of, for example, removing or suppressing interfering metal ions from a flowback fluid or a cross-linked gelling agent. In some embodiments, at least a portion of the competitive binder is encapsulated by an encapsulant that forms a layer that controllably releases the competitive binder. One of the main advantages of encapsulation includes delaying the metal ion binding at relatively high temperatures. In some embodiments, at least a portion of the competitive binder is encapsulated by an encapsulant thereby controllably delaying delinking of the cross-linked polymer. In some embodiments, the ratio of competitive binder and the encapsulant is present in a ratio of about 0.001 to about 5 by weight, preferably about 0.01 to about 1 by weight.

Suitable encapsulants include, but are not limited to, ethyl cellulose, gelatin, starch, latex, shellac, poly(methyl methacrylate), polyvinylidene chloride, polyacrylate, titanium dioxide, and combinations of these. In some embodiments, the encapsulant is degradable or biodegradable. Examples of suitable degradable polymers include, but are not limited to, polysaccharides (such as dextran or cellulose); chitins; chitosans; proteins; aliphatic polyesters; polylactic acids; poly (glycolides); poly($\epsilon$-caprolactones); poly(hydroxy ester ethers); poly(hydroxybutyrates); poly(anhydrides); aliphatic polycarbonates; orthoester; poly(orthoesters); poly(amino acids); poly(ethylene oxides); poly(phosphazenes); poly etheresters, polyester amides, polyamides, and copolymers or blends of any of these degradable materials. The term "copolymer," as used herein, is not limited to the combination of two polymers, but includes any combination of polymers, e.g., terpolymers, block copolymers, graft copolymers, star block copolymers, and the like.

In some embodiments, a cross-linked gelling agent is formed from a reaction comprising a metal cross-linking agent and a gelling agent polymer that may be selected from the group consisting of biopolymers (such as guar, xanthan, polysaccharides, and cellulose), synthetic polymers, any derivatives of these, and any combinations of these. A cross-linked gelling agent may increase the viscosity of a particular fluid. Cross-linked gelling agents that depend on metal coordination may be delinked by the addition of competitive binders, according to the methods of the present invention.

In some embodiments, the competitive binder interacts with the cross-linked gelling agent in a viscosified treatment fluid at a temperature from about 24° C. (75° F.) to about 204° C. (400° F.), preferably from about 27° C. (80° F.) to about 149° C. (300° F.).

The present invention provides methods generally comprising: providing a competitive binder; providing a viscosified treatment fluid having a cross-linked gelling agent and having a first viscosity; allowing the competitive binder to interact with the cross-linked gelling agent of the viscosified treatment fluid so as to delink the cross-linked gelling agent thus reducing the first viscosity of the viscosified treatment fluid to a second viscosity.

The present invention also provides methods comprising: introducing a first competitive binder to a flowback fluid wherein the first competitive binder coordinates with an interfering metal ion in the flowback fluid thereby forming a competitive binder-metal complex; filtering out the competitive binder-metal complex thereby forming a reusable fluid; using the reusable produced water as a base fluid to form a treatment fluid having a first viscosity; introducing the treatment fluid to a subterranean formation and allowing a cross-linked gelling agent to form; and introducing a second competitive binder to the treatment fluid thereby delinking the cross-linked gelling agent of the viscosified treatment fluid so as to reduce the first viscosity of the viscosified treatment fluid to a second viscosity.

In some embodiments, the first competitive binder and the second competitive binder are the same.

To facilitate a better understanding of the present invention, the following examples of preferred embodiments are given. In no way should the following examples be read to limit, or to define, the scope of the invention.

EXAMPLE 1

In this Example, tannic acid (metal ion binder) and ammonium persulfate breaker (an oxidizer available as OPTIFLO III™ from Halliburton Energy Services Inc., Houston, Tex.) have been evaluated for gel breaking performance at various temperatures using a rheometer commercially available as MODEL 5550 PRESSURIZED VISCOMETER from AMETEK Chandler Instruments, Broken Arrow, Okla. with B5X bob at 95 rpm. OPTIFLO III™ is a breaker designed for use with guar and guar-derivative fracture fluids at actual fluid temperatures from 52° C. (125° F.) to 93° C. (200° F.). The tests were done on a guar-based fracturing fluid whose composition is described in Table 1 below. All of the components listed are commercially available from Halliburton Energy Services Inc., Houston, Tex.

TABLE 1

| Components | Amount per 1000 mL |
|---|---|
| Tap Water | 1000 mL |
| Gelling Agent: WG-19 (Guar) | 3.6 g |
| Clay Control: CLAYFIX II ™ (alkylated quaternary chloride) | 2 gpt |
| Buffering Agent: BA-20 ™ (ammonium acetate) | 0.2 gpt |
| Surfactant: LOSURF 300M ™ (non-ionic surfactant) | 1 gpt |
| Buffering Agent: MO-67 ™ (sodium hydroxide) | To adjust pH 10.5 |
| Crosslinker: CL-28M ™ (boron crosslinker) | 0.9 gpt |

In each test, the fracturing fluid and the appropriate amount of breaker was introduced into the MODEL 5550 PRESSURIZED VISCOMETER. The viscosity of the fracturing fluid was then monitored.

Figure 2:
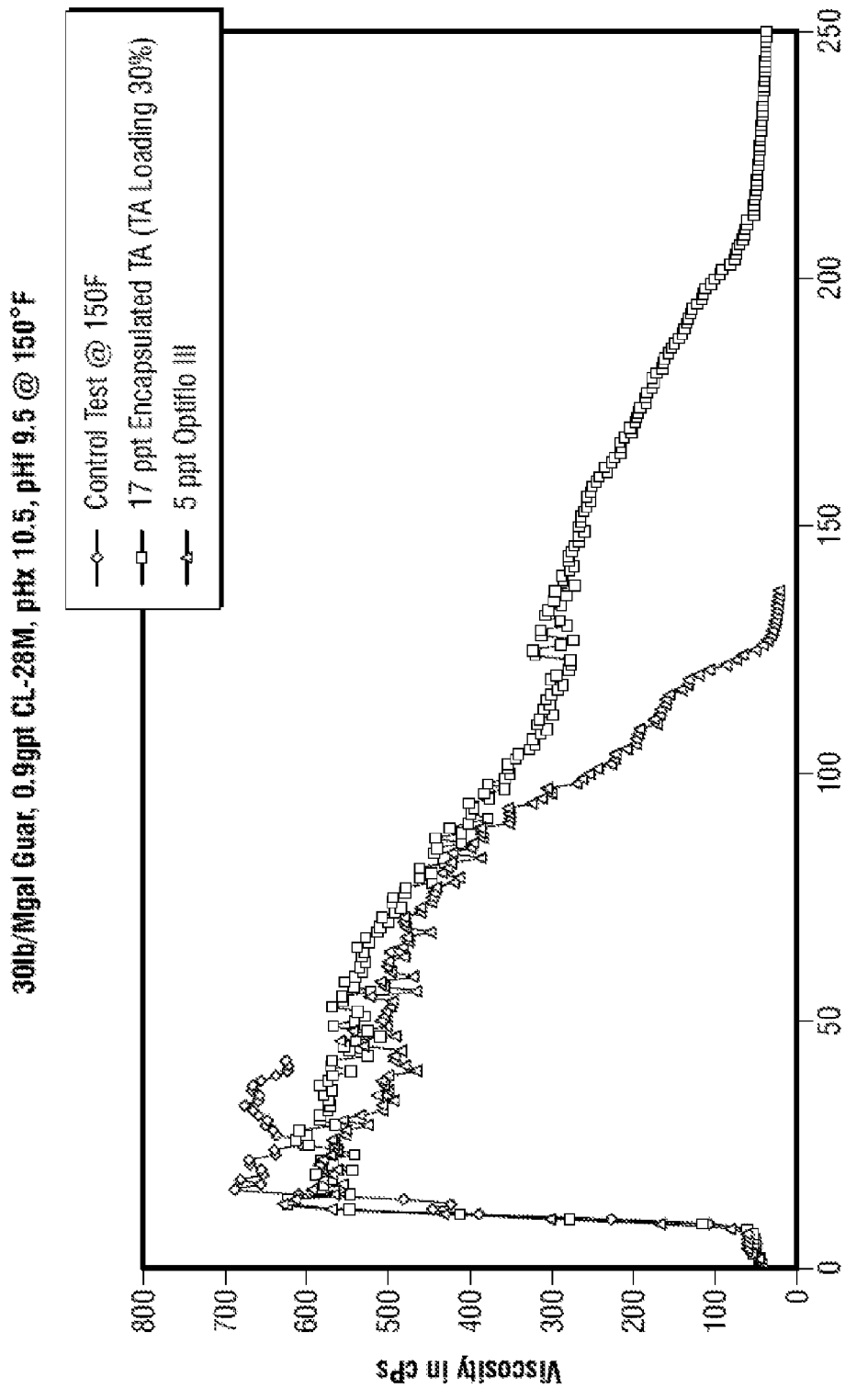
FIG. 2 shows a rheological plot as described in Example 1.
Figure 3:
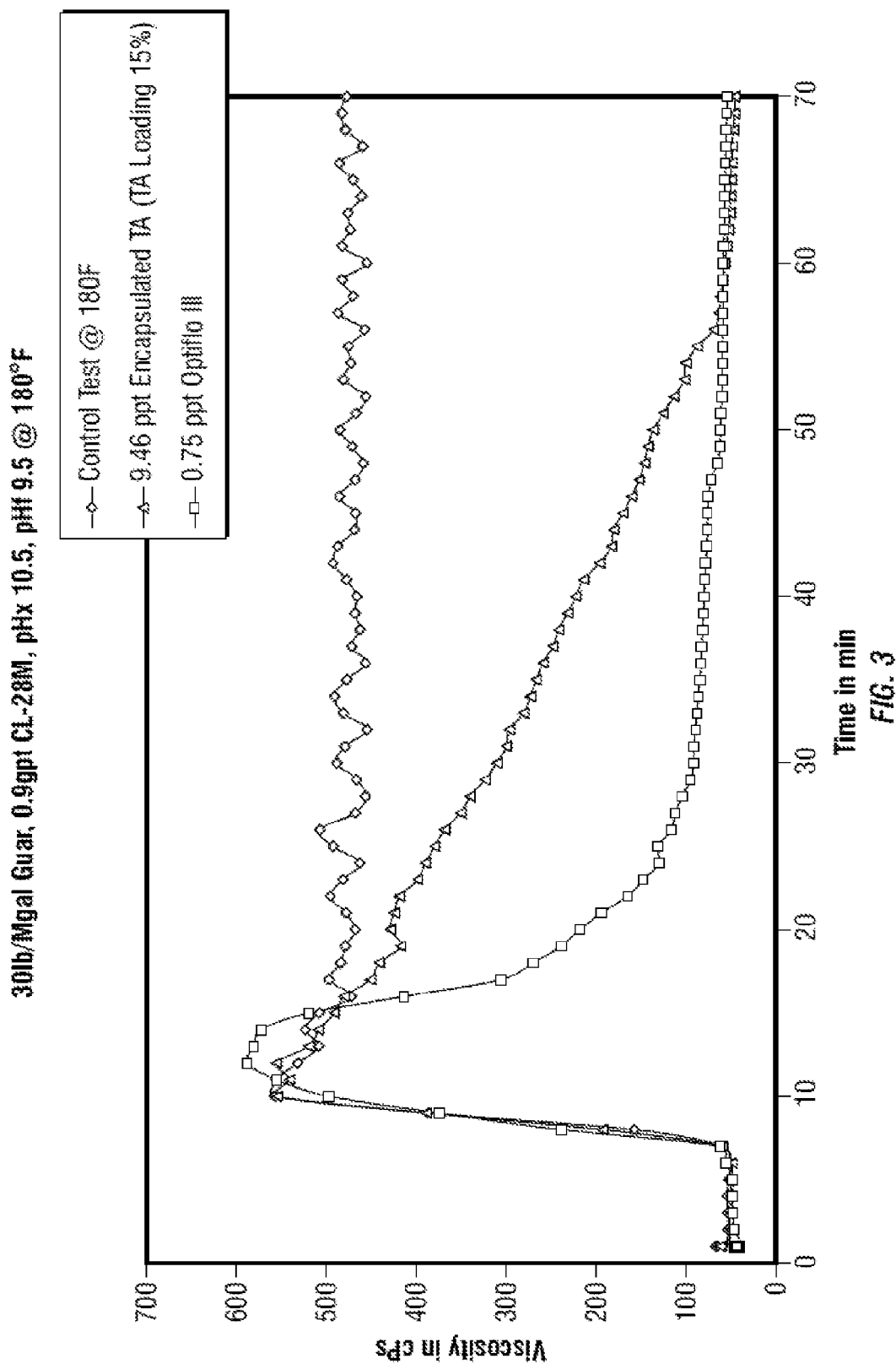
FIG. 3 shows a rheological plot as described in Example 1.

FIGS. 1-3 (54° C. or 130° F., 66° C. or 150° F., and 82° C. or 180° F. respectively) show a viscosity versus time plot of fracturing fluids containing an encapsulated tannic acid at various temperatures. At all three temperatures, 30 lb/Mgal of guar-based fluids comprising 0.9 gpt boron crosslinker at pHx 10.5 and pHf 9.5 were used. pHx is the cross-linked pH recorded just after the sample was loaded on a viscometer while pHf is the final pH after completion of the test. Table 2 below summarizes the test conditions. The tannic acid loading percentage represents the percentage of tannic acid based on the total weight of the encapsulated material.

TABLE 2

| Temperature | Tannic Acid concentration | Optiflo III ™ concentration | Tannic Acid Loading % | CL-28M ™ concentration |
|---|---|---|---|---|
| 54° C. (130° F.) | 14 ppt | 5 ppt | 50 | 0.9 gpt |
| 66° C. (150° F.) | 17 ppt | 5 ppt | 30 | 0.9 gpt |
| 82° C. (180° F.) | 9.46 ppt | 0.75 ppt | 15 | 0.9 gpt |

At least one test using neat tannic acid (without encapsulation) was performed at 54° C. (130° F.). The neat tannic acid absorbs crosslinkers rapidly and prevents gelation from taking place (FIG. 1). It is believed that neat tannic acid was bound to the boron ions and thus prevented gelation. This is believed to be evidenced by the fact that the guar-based fluid comprising neat tannic acid did not increase viscosity upon heating (not shown). By contrast, it is believed that encapsulated tannic acid showed an increase in viscosity and then a delayed reduction in the viscosity of the guar-based fluid over a period of time. Control tests were performed with CL-28M™ crosslinker, but without encapsulated breakers, otherwise no viscosity would be observed. Two tests were carried out under conditions similar to the control. The first test was performed with encapsulated tannic acid while the second test was performed with OPTIFLO III™. Without any breaker material, the control run was expected to show good, stable viscosity as observed in FIGS. 1-3. The controls did not significantly lower the viscosity of the guar based fluid (FIGS. 1-3). Breaker samples of OPTIFLO III™ were also tested (FIGS. 1-3). While 5 ppt OPTIFLO III™ was slightly better than 14 ppt encapsulated tannic acid at delaying the reduction of viscosity at 54° C. (130° F.) (FIG. 1), encapsulated tannic acid was able to delay breaking longer than the OPTIFLO III™ at the higher temperatures 66° C. (150° F.) and 82° C. (180° F.) (FIGS. 2 and 3).

Example 1 shows, among other things, that an encapsulated tannic acid is able to delay the breaking of guar-based fluids as compared to neat tannic acid. The encapsulated tannic acid is also able to delay breaking longer compared to OPTIFLO III™ at 66° C. (150° F.) and 82° C. (180° F.). As a result, encapsulation of tannic acid is necessary for the gelation of the guar polymer as well as providing controlled fracturing. The rheology profiles also show that tannic acid released from the encapsulant in a controlled manner and was able to remove the crosslinker. The encapsulated tannic acid composition performs well in the temperature range of 38-93° C. (100-200° F.). It is believed that similar results may be obtained with hydroxylpropyl guar (HPG) and carboxy methyl hydroxylpropyl guar (CMHPG) in combination with boron or metal crosslinkers.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a competitive binder grafted to a solid surface; and
   allowing the competitive binder produced from a wellbore to interact with interfering metal ions in a flowback fluid to remove interfering metal ions.

2. The method of claim 1 further comprising: using the flowback fluid to form a treatment fluid or disposing of the flowback fluid.

3. The method of claim 2 wherein the treatment fluid is a fracturing fluid, a drilling fluid, a cementing fluid, or a gravel packing fluid.

4. The method of claim 1 wherein the competitive binder is a soluble or insoluble in the flowback fluid.

5. The method of claim 1 wherein the interfering metal ions comprise at least one metal ion selected from the group consisting of: calcium, magnesium, strontium, boron, iron, titanium, chromium, cobalt, copper, manganese, aluminum, hafnium, zirconium, and any combination of these.

6. The method of claim 1 wherein the competitive binder comprises at least one competitive binder selected from the group consisting of: tannic acid, ethylenediaminetetraacetic acid, nitrilotriacetic acid, catechol, dopamine, sorbitol, salicylic acid, fluoride, 4-amino-2-hydroxybenzoic acid, polyol, polyphenol, polycarboxylate, hydroxycarboxylate, hydroxylamide, amines, polyamine, polyaminecarboxylate, polycarboxylic acid, polyamides, polyphosphates, polyphosphonates, phosphates, phosphonates, polysaccharides, substituted polysaccharides containing chelant groups, chitosan, chitin, and any combination of these.

7. The method of claim 1 wherein the competitive binder is present in less than about 5% by weight of the flowback fluid.

8. The method of claim 1 wherein the solid surface is a bead that has been packed in a column.

9. The method of claim 1 further comprising: removing the competitive binder bound to a solid surface from flowback fluid by filtration.

10. A method comprising:
    providing a competitive binder grafted to a solid surface;
    providing a viscosified treatment fluid having a cross-linked gelling agent and having a first viscosity;
    allowing the competitive binder to interact with the cross-linked gelling agent of the viscosified treatment fluid so as to delink the cross-linked gelling agent thus reducing the first viscosity of the viscosified treatment fluid to a second viscosity.

11. The method of claim 10 wherein the competitive binder comprises at least one competitive binder selected from the group consisting of:
    tannic acid, ethylenediaminetetraacetic acid, nitrilotriacetic acid, catechol, dopamine, sorbitol, salicylic acid, fluoride, 4-amino-2-hydroxybenzoic acid, polyol, and polyphenol, polycarboxylate, hydroxycarboxylate, hydroxylamide, amines, polyamine, polyaminecarboxylate, polycarboxylic acid, polyamides, polyphosphates, polyphosphonates, phosphates, phosphonates, polysaccharides, substituted polysaccharides containing chelant groups, chitosan, chitin, and any combination of these.

12. The method of claim 10 wherein the competitive binder is encapsulated by an encapsulant.

13. The method of claim 12 wherein the encapsulant comprises at least one encapsulant selected from the group consisting of: ethyl cellulose, gelatin, starch, latex, shellac, poly (methyl methacrylate), polyvinylidene chloride, titanium dioxide, polyacrylate, and any combination of these.

14. The method of claim 10 wherein the viscosified treatment fluid is a fracturing fluid, gravel packing fluid, a workover fluid, or an acidizing fluid.

15. The method of claim 10 wherein the cross-linked gelling agent is formed from a reaction comprising a polymer selected from the group consisting of: guar, xanthan, polysaccharide, cellulose, synthetic polymer, and any combination of these.

* * * * *